United States Patent

[11] 3,599,190

[72] Inventor James L. Smith
Bedminster, N.J.
[21] Appl. No. 878,411
[22] Filed Nov. 20, 1969
[45] Patented Aug. 10, 1971
[73] Assignee Bell Telephone Laboratories, Incorporated
Murray Hill, Berkeley Heights, N.J.

[54] MAGNETIC DOMAIN LOGIC ARRANGEMENT
8 Claims, 14 Drawing Figs.

[52] U.S. Cl. ........ 340/174 TF, 340/174 SR, 340/174 HP
[51] Int. Cl. ........ G11c 19/00, G11c 11/14
[50] Field of Search ........ 340/174 TF, 174 SR

[56] References Cited

UNITED STATES PATENTS 3,508,225 4/1970 Smith ........ 340/174

*Primary Examiner*—James W. Moffitt
*Attorneys*—R. J Guenther and Kenneth B. Hamlin

ABSTRACT: Single wall domains are moved in a sheet of magnetic material along paths defined by pole patterns in magnetically soft overlays in response to reorienting magnetic fields in the plane of the sheet. The direction in which domains move is determined by the magnetic state of high coercive force material adjacent selected portions of the overlay for selectively modifying pole patterns.

INVENTOR
J. L. SMITH
Herbert M. Shapiro
ATTORNEY

MAGNETIC DOMAIN LOGIC ARRANGEMENT

FIELD OF THE INVENTION

This invention relates to data processing arrangements and more particularly to such arrangements including magnetic material wherein information is represented as single wall reverse-magnetized domains.

BACKGROUND OF THE INVENTION

A single wall domain is a magnetic region encompassed by a single domain wall which closes on itself in the plane of a sheet of material in which the domain is moved. The encompassing domain wall does not intersect the edges of the sheet. Consequently, movement of such a domain is not constrained by the boundary of the sheet and the domain is free to move in the plane of the sheet. Domains of this type along with the movement thereof are described in the Bell System Technical Journal (BSTJ), Vol. XLVI, No. 8, Oct. 1967, at page 1901 et seq.

There are a variety of techniques for moving single wall domains. One technique which requires no external connection for its implementation is described in copending application Ser. No. 732,705, filed May 28, 1968 and now U.S. Pat. No. 3,534,347 for A. H. Bobeck. The technique includes a shaped overlay of high permeability material on a surface of the sheet in which single wall domains are moved. A field generating means supplies a field in the plane of the sheet to generate pole patterns in the end portions of the overlay having long dimensions aligned with the field. Typically, single wall domains occur in materials which are uniaxial along an axis normal to the plane of the sheet. Therefore, the in-plane field has only negligible direct effect on those domains. The poles generated in the overlay, on the other hand, function to attract the domains. The field is reoriented to move the pole patterns to attract the domains along predictable paths depending on the consecutive orientations of the in-plane field and the geometry of the overlay. In an illustrative arrangement, the overlay has a T-shaped and bar geometry arranged in repetitive patterns to define propagation channels. The in-plane field is reoriented by continuous rotation to move domains synchronously from input to output positions in those channels.

Inasmuch as external connections are absent from such a propagation implementation, movement of a selected one of a plurality of single wall domains is difficult. But, logic operations between selected ones of these domains can be realized by different overlay geometries which vary the movements of domains at prescribed positions depending, for example, on the presence or absence of other domains at those positions. Such operation is disclosed, for example, in copending application Ser. No. 795,148, filed Jan. 30, 1969 for R. H. Morrow and A. J. Perneski.

External connections, on the other hand, do provide simple means for generating field patterns selectively for manipulating domains in a manner to carry out logic operations. The wiring patterns for generating the requisite fields are typically of a loop configuration to correspond with the circular geometry of a domain as shown in the above-mentioned BSTJ article. The current-carrying requirements on such wires along with the requisite loop configuration of the wires necessitate a sacrifice in packing density and are relatively costly as well.

Clearly, a tradeoff between the two propagation techniques which allows a simplification of the geometry of such wires and/or a reduction in number is advantageous.

An object of this invention is to provide a hybrid single wall domain propagation logic arrangement including an overlay and a simplified wiring configuration.

BRIEF DESCRIPTION OF THE INVENTION

The invention is based on the realization that a T-shaped, high permeability overlay on a sheet of material in which single wall domains can be moved can be made to respond to a switching field to perform the function of a latching switch if the base portion of the T-shape comprises a laminate structure including, in addition to a layer of high permeability material, a layer of high coercive force material which is not reset by in-plane fields during operation. By a proper selection of the flux associated with each layer, attracting poles may be denied the position at the head of the base portion of the T-shape during normal operation when the high coercive force layer is switched to a first magnetic state. When the high coercive force layer, on the other hand, is switched to a second state, propagation of domains follows in response to the normal succession of in-plane field reorientations.

Individual "laminate" T-shapes may be accessed by individual conductors or accessing may be implemented on a coincident current basis if an external translator is present.

Accordingly, a feature of this invention is a medium in which single wall domains can be moved with a magnetically soft T-shaped overlay having a head and a laminate base portion wherein the base portion includes an additional relatively high coercive force layer, and drive means for switching the magnetization of the high coercive force layer selectively.

DETAILED DESCRIPTION

Figure 1:
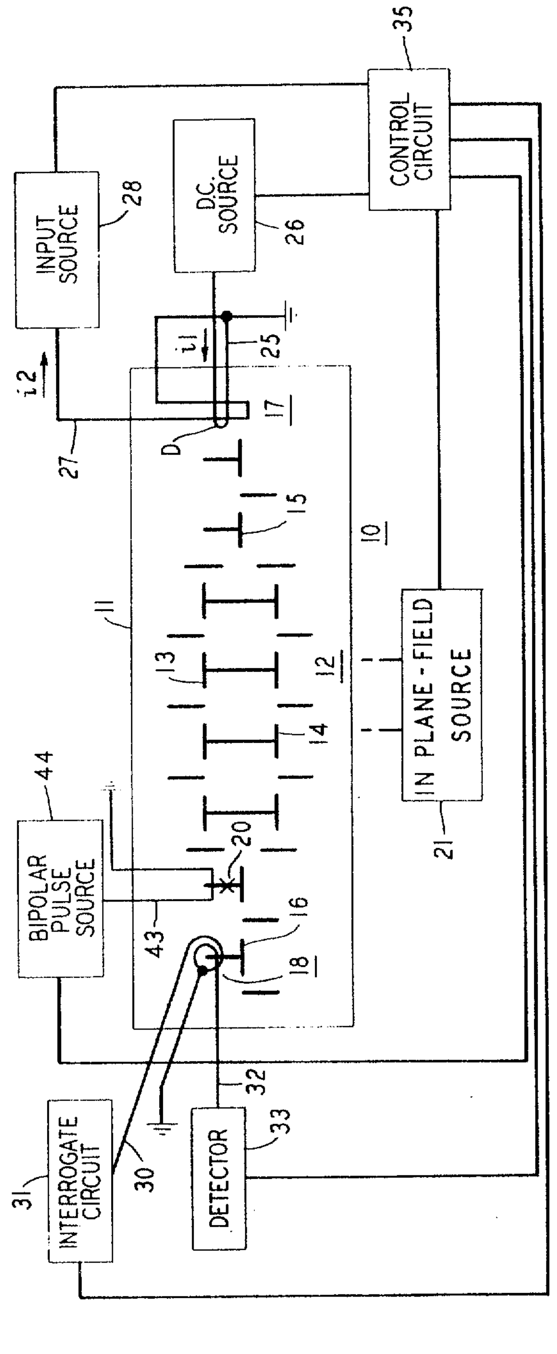
FIG. 1 is a schematic illustration of a domain propagation arrangement including a latching switch in accordance with this invention.

FIG. 1 shows a domain propagation arrangement 10 including a sheet of magnetic material 11 in which single wall domains can be moved. Magnetically soft overlays of bar and T-shaped geometries define a recirculating loop 12 with top and bottom channels 13 and 14 respectively. The overlays also define input and output channels 15 and 16 respectively which connect the recirculating loop to input and output sites 17 and 18.

A laminate T-shaped latching switch is defined at 20 in the output channel of the arrangement of FIG. 1. As will become clear, domain patterns introduced at 17 normally propagate to the left along the bottom channel of the recirculating loop and to the right along the top channel as long as switch 20 is open. When the switch is closed, domains are moved along the output channel to a detector. The propagation operation is, illustratively, in response to an in-plane field rotating clockwise as viewed in the figure. Block 21 represents the source of such a field as may be provided, conveniently, by orthogonal coil pairs driven in quadrature.

Domains are introduced selectively by an illustrative input arrangement shown at 17 in FIG. 1. An edge portion of sheet 11 is maintained in an assumed positive magnetic condition as a source of domains. This geometry is maintained conveniently by a conductor 25 connected between a DC source 26 and ground. A positive current in the direction of arrow $i1$ is assumed to generate the appropriate field.

A hairpin conductor 27 intersects a portion of the area encompassed by conductor 25. Conductor 27 is connected between an input source 28 and ground. When a pulse, represented by arrow $i2$ in FIG. 1, is applied to conductor 27, a tip portion D of the area encompassed by conductor 25 is separated to form a domain for propagation. The edge portion is restored to its original geometry by the field generated by the current in conductor 25 when the pulse in conductor 27 terminates. The presence and absence of a pulse on conductor 27 determines the presence and absence of domains in allocated time slots (in-plane field cycles) and thus the representation of binary ones and zeros.

Domains are detected illustratively at the output position 18. A conductor 30, coupling the output position, is connected between an interrogate circuit 31 and ground. An additional conductor 32, also coupling the output position, is connected between a detector 33 and ground. A pulse on conductor 30 is of a polarity to collapse domains in the output position. In turn, the collapse of a domain generates a pulse in conductor 32 for detection by detector 33.

The various sources and circuits are connected to a control circuit 35 for synchronization and activation and may be any such elements capable of operating in accordance with this invention.

As was stated hereinbefore, domain patterns recirculate in the closed loop 12 without moving to the output position for detection as long as gate 20 is open. For an understanding of the operation of gate 20, it is helpful to understand the mechanism for propagating domain patterns in response to a rotating in-plane field.

Figure 2:
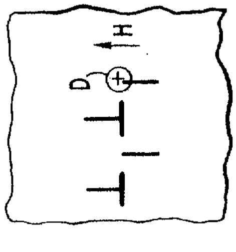
FIGS. 2—14 are illustrations of portions of the arrangement of FIG. 1 showing the magnetic states thereof during operation.

FIG. 2 shows a portion of the overlay pattern of FIG. 1. The direction of the in-plane field is represented by the arrow designated H in the figure. Those portions of the overlay which have long dimensions aligned with the field have positive poles accumulated thereon to which, we assume, the illustrative magnetic domains are attracted. A domain is represented as a circle designated D to indicate its origin from tip portion D above. The pertinent pole concentration is represented as a plus sign. FIG. 2 shows a consistent initial position for an illustrative propagation demonstration.

Figure 3:
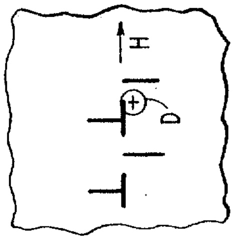

In FIG. 3, arrow H is directed to the right. The poles are in different positions and the domain D moves to the closest attracting pole concentration.

Figure 4:
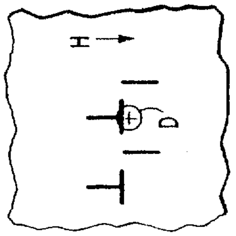

FIG. 4 shows arrow H directed downward. The resulting pole concentrations are at the bottom of the vertically oriented portions of the overlay as shown by the plus sign in the figure. Domain D moves to the position shown.

Figure 5:
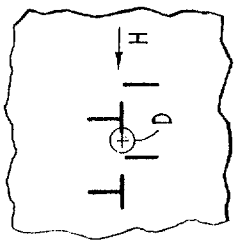

FIG. 5 shows arrow H directed to the left. The domain again moves to the left as viewed.

Figure 6:
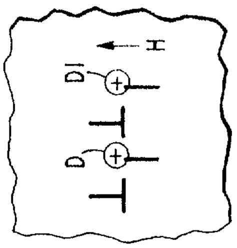

FIG. 6 shows arrow H in its assumed initial orientation. Domain D now has traveled one full cycle and a new domain D1 may be moved along therewith synchronously as field H again reorients. The propagation operation is clearly the result of the attraction of pole patterns changing responsive to reorienting in-plane fields.

A latching switch in accordance with this invention operates to deny a normal position for the attracting pole concentrations. In the organization of FIG. 1, the left side of the recirculating loop, as viewed, has a latching switch 20 which enables or denies a preferred path for domains. An alternative path follows the recirculating loop. The output, of course, is on the downstream side of the switch and no domains are detected unless the switch is in a closed condition to enable the preferred path.

Figure 7:
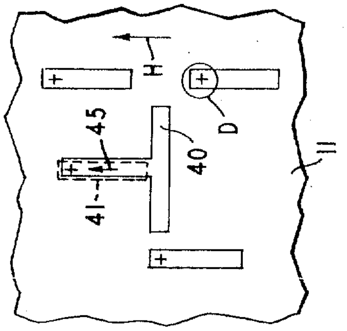

FIG. 7 shows, enlarged, the portion of sheet 11 including the latching switch 20 of FIG. 1. The latching switch may be seen to include a T-bar geometry 40 with an overlay 41 of a material having a sufficiently high coercive force to exhibit only negligible flux changes in response to the in-plane field. Layer 41 is in a first or second magnetic state depending on whether domain patterns are to be recirculated or propagated to the output position. These states are realized conveniently by a pulse in a wire 43 of FIG. 1. Wire 43 is connected to a bipolar pulse source 44 and ground. Pulse source 44 is connected to control circuit 35.

Figure 9:
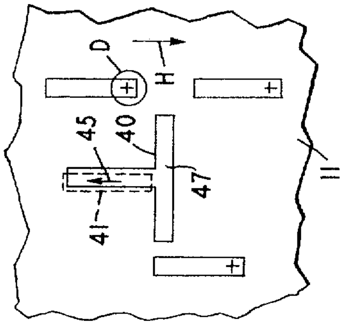

The first state for layer 41 is indicated by the arrow 45 in FIG. 7. Layer 41 is chosen to have the same amount of flux as the T-shape layer to which it is coupled, illustratively half that of the remainder of the magnetically soft overlay. Consequently, when the in-plane field is directed downward, as viewed for example in FIG. 4, no poles accumulate on the base portion of T-shaped overlay 40. The resulting pole configurations for a complete cycle of the in-plane field are shown in FIGS. 7, 8, 9, and 10. In FIG. 9, it will be seen that plus poles also are absent on T-shaped overlay 40 when the in-plane field is again directed downward.

A domain D in FIG. 6 may be understood to be advanced to the position shown in FIG. 7 in response to one additional cycle of the in-plane field. The domain next moves to the position shown in FIG. 8 when the field rotates to the position indicated by arrow H in that figure.

Figure 10:
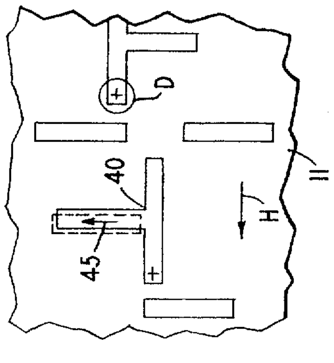

When the in-plane field next reorients to the downward position shown in FIG. 9, domain D moves upward and to the right to the position shown there. The reason for this, of course, is that the position 47 of FIG. 9 is denied to it because layer 41 is in a condition to prevent the accumulation of positive poles there. Domain D now moves to the right in the upper channel of the recirculating loop as the in-plane field rotates further as indicated in FIG. 10. The remainder of the domain pattern in the loop follows.

Figure 11:
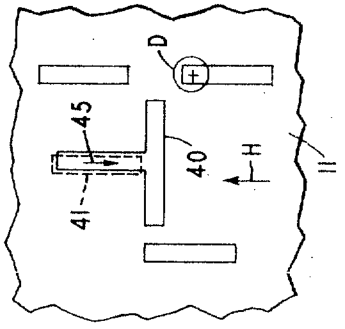

FIGS. 11 through 14 illustrate the movement of domains through the overlay of FIGS. 7—10 when the latching switch 20 is in a state to enable the path to the output position. FIG. 11 shows arrow 45 in a downward direction representing the second state of overlay 41. When the in-plane field H is directed upward as viewed in FIG. 11, the pole pattern is as indicated by the plus signs. There are no plus signs on T-shape overlay 40 because the flux there is chosen equal and opposite to the flux in film 41. When the field reorients to the right as viewed in FIG. 12, domain D again moves as it did in FIG. 8.

Figure 13:
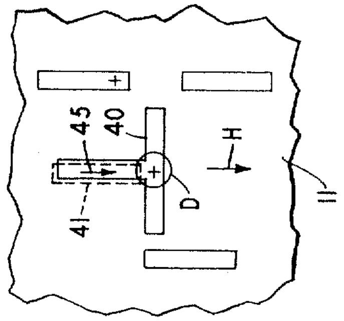
Figure 8:
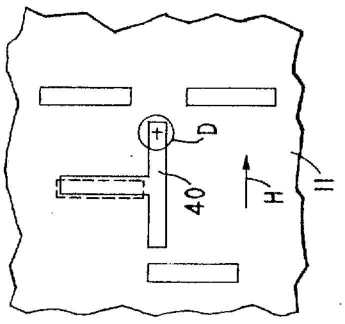
Figure 12:
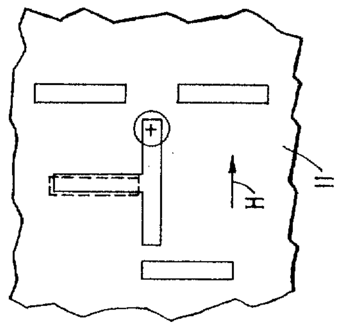

When the field reorients downward as shown in FIG. 13, poles are generated in the center of the base of T-shape 40 (position 47) and domain D moves to the position indicated rather than to the position shown for it in FIG. 9.

Figure 14:
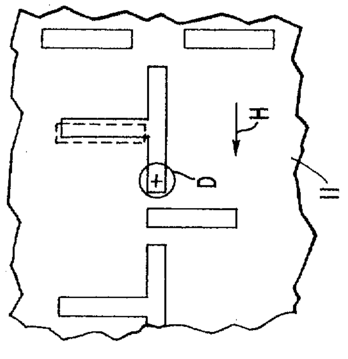

Domain D now moves to the left along the output channel in response to additional cycles of the in-plane field as indicated in FIG. 14.

We have now illustrated the movement of a domain along first and second paths at an intersection between two paths depending upon the state of a latching switch at that intersection in accordance with this invention. The state of the latching switch is determined by a pulse from source 44 on conductor 43 of FIG. 1.

Source 44 is under the control of a control circuit which may be a telephone repertory dialer selector. In a repertory dialer context, the arrangement of FIG. 1 may be but one of, typically, 50 such arrangements, organized in parallel and selectively connected into a common domain propagation channel for both input and output operations through latching switches. Domain patterns representative of telephone numbers recirculate about loops in which they are stored to be selected for dialing in response to a select signal from source 44. Source 44 may be adapted to selectively pulse 50 conductors 43 each connected to a different latching switch for this purpose. Inasmuch as the switch is latching, it remembers the origin of information passed from the recirculating loop into the common channel and permits the return of the information only into the originating loop. A repertory dialer memory of this type is disclosed in copending application Ser. No. 878,366, filed Nov. 20, 1969 for P. I. Bonyhard, D. E. Kish, and J. L. Smith.

With domains having diameters as large as 3 mils, an entire 50 number repertory dialer can be made on a slice of, for example, samarium terbium orthoferrite, 3 mils thick and 0.7 inch on a side. The magnetically soft overlay in an illustrative instance is 5,000 angstrom units thick permalloy having a coercive force of 3 oersteds and having a repeat pattern of 10 mils. This overlay typically is deposited by photographic techniques onto a suitable substrate and juxtaposed with the orthoferrite slice. Each high coercive force layer for a latching switch is illustratively a CoFe (57 percent cobalt by weight) layer having a coercive force of over 30 oersteds. The in-plane field is 10—30 oersteds. The domains are maintained stable during operation by a bias field (from a source not shown) of 42 oersteds.

What has been described is considered merely illustrative of the principles of this invention. Other and different arrangements according to those principles may be devised by one skilled in the art without departing from the spirit and scope of this invention.

What I claim is:

1. Apparatus comprising magnetic material in a plane in which single wall domains can be moved and having a first surface, a magnetically soft first overlay adjacent said first surface, said overlay having a geometry to generate in response to a reorienting in-plane field magnetic pole patterns in consecutive positions in each of a first and an alternative second path defined thereby to intersect at a first of said positions, a second layer of a material having a coercive force sufficiently high to be unaffected by said in-plane field, said second layer being located at said first position, means for selectively switching said second layer to a condition to inhibit the generation of magnetic poles there for denying said first path to the advance of domains, means for introducing single wall domains selectively at an input position in said second path, means for generating said reorienting in-plane field, and means for detecting the presence of domains at an output position in said first path.

2. Apparatus in accordance with claim 1 wherein said first overlay comprises bar and T-shape geometries and said in-plane field reorients by continuous rotation.

3. Apparatus in accordance with claim 2 wherein said second path closes on itself at said first position to provide for the recirculation of patterns of domains therein in response to a continuously rotating in-plane field when said second layer is in a condition to inhibit.

4. Apparatus in accordance with claim 2 wherein a prescribed T-shape overlay at said first position includes said second layer adjacent its base portion.

5. Apparatus in accordance with claim 4 wherein the base portion of said prescribed T-shape overlay and said adjacent second layer have equal flux capacity.

6. Apparatus in accordance with claim 5 wherein said base portion of said prescribed T-shape overlay comprised permalloy and CoFe layers having coercive forces of about 0 and greater than 30 respectively, and said in-plane field is between 10—30 oersteds.

7. Apparatus comprising a material in a plane in which single wall domains can be moved and having a first surface, a magnetically soft first overlay adjacent said surface, said overlay having a geometry to provide pole patterns in consecutive positions along a first path responsive to a field reorienting in said plane, a second layer having a coercive force sufficiently high to be unaffected by said in-plane field and having first and second magnetic states, said second layer being in a first of said consecutive positions to inhibit the generation of poles in said first position when in said first magnetic state and to enable the generation of poles in said first position when in said second magnetic state, and means for switching said second layer between said first and second states.

8. Apparatus in accordance with claim 7 wherein said first overlay also defines a second path intersecting said first path at said first position for providing an alternative path for domain propagation when said second layer is in a state to inhibit.